Patented Apr. 29, 1952

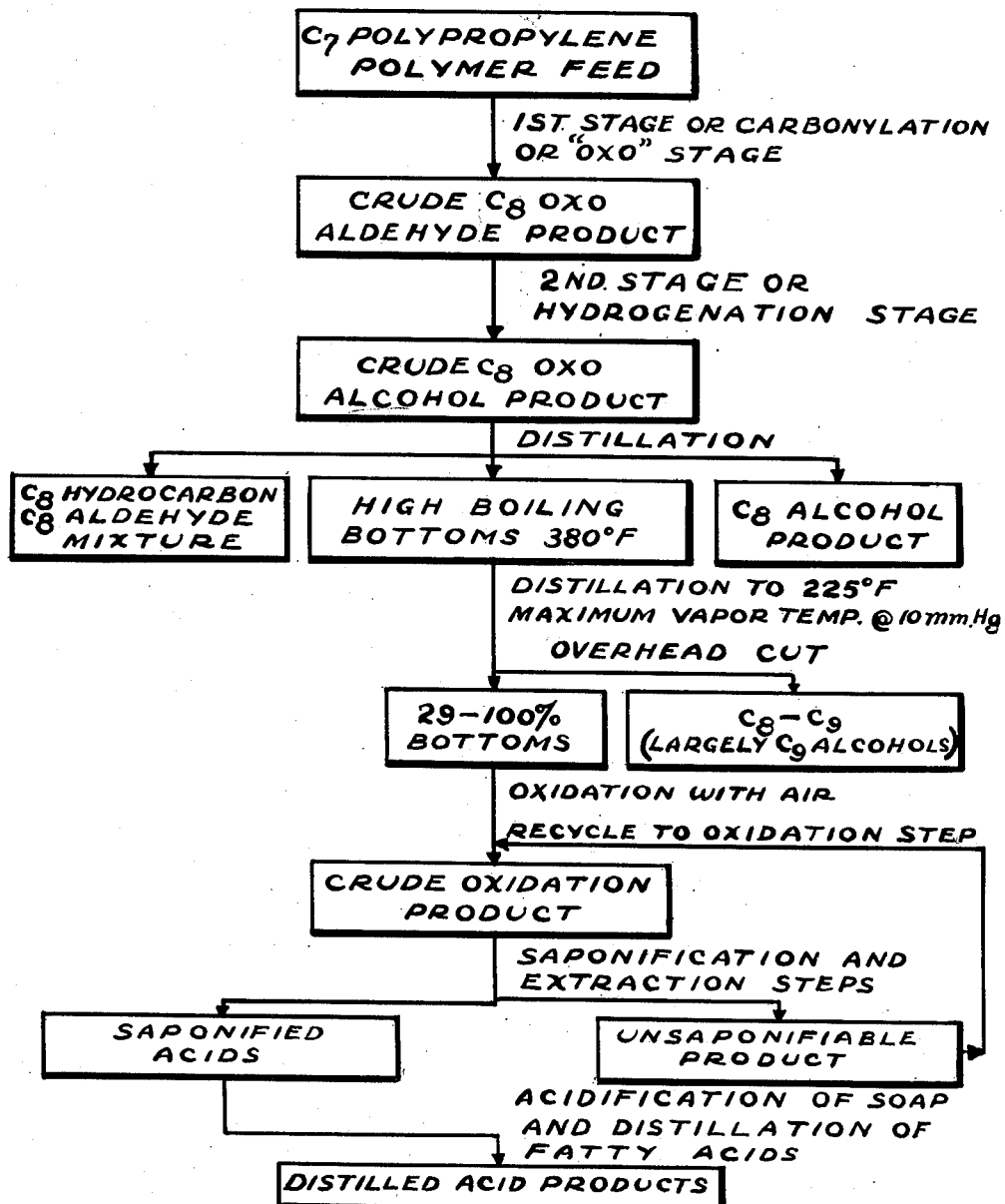

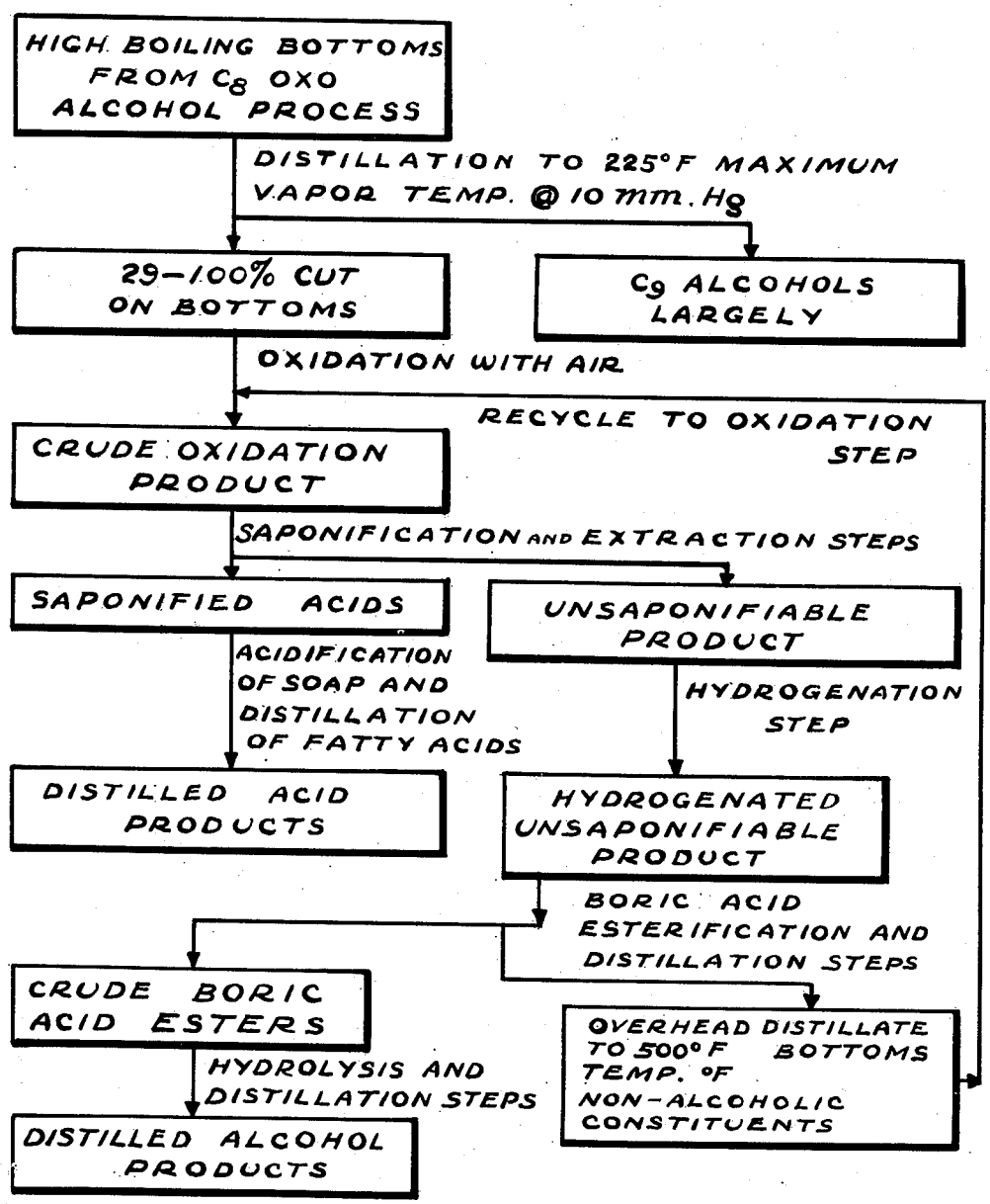
Fig.—2

2,594,341

UNITED STATES PATENT OFFICE 2,594,341

UTILIZATION OF OXO BOTTOMS

John J. Owen and Egi V. Fasce, Baton Rouge, La., assignors to Standard Oil Development Company, a corporation of Delaware Application September 13, 1949, Serial No. 115,432

11 Claims. (Cl. 260—418)

This invention relates to a highly selective liquid phase oxidation reaction for utilization of certain selected higher boiling fractions of synthetic organic products obtained by the Oxo synthesis reactions. The invention is particularly useful for the preparation of alcohols and acids.

The discovery has now been made that mixtures containing predominantly acetals, ethers, and higher molecular weight alcohols, as well as some esters and hemi-acetals, obtained as Oxo bottoms product from a distillation of an alcohol prepared by the Oxo reaction, may be selectively oxidized using an oxygen-containing gas, preferably air, in the presence of a metallic soap catalyst, to yield products which have been found to consist of a mixture of fatty acids and alcohols.

It is now well known that oxygenated organic compounds may be synthesized from olefins by reaction of the latter with carbon monoxide and hydrogen in the presence of a catalyst followed by catalytic hydrogenation in a two-stage process. In the first stage, the olefinic material, the carbonylation catalyst, and CO and $H_2$ are reacted to give a product which consists predominantly of aldehydes. This material is catalytically hydrogenated in the second stage to give the corresponding alcohols. The over-all reaction may be formulated as follows:

Stage 1.

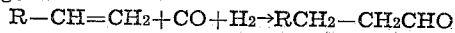

Stage 2.

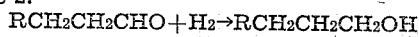

Both the aldehyde and the alcohol formed as a result of the reaction contain one more carbon atom than the olefinic material from which they are derived.

Alcohols from the second stage of the reaction are used as intermediates for the preparation of plasticizers and detergents. Alcohols prepared by the Oxo reaction and having from eight to sixteen carbon atoms find maximum usefulness for these purposes.

The carbonylation, or Oxo stage, as it is sometimes called, is widely useful and is used effectively with both long and short chain olefinic compounds, depending on the type alcohol desired. Thus, straight and branch chained olefins and diolefins such as propylene, butylene, butadiene, pentene, pentadiene, hexene, heptene, olefin polymers such as di- and tri-isobutylene, the hexene and heptene dimers, polypropylenes, and olefinic fractions from the hydrocarbon synthesis process or from thermal or catalytic cracking operations, and other sources of hydrocarbon fractions containing such olefins may be used as starting materials, depending on the nature of the final product desired. In general, olefins having up to about 18–20 carbon atoms in the molecule are preferred in this reaction. Olefins of $C_7$ to $C_{15}$ ranges are, of course, required to prepare the preferred $C_8$ to $C_{16}$ alcohols.

The catalysts for the first stage of the process are usually employed in the form of the catalytically active metal salts of high molecular weight fatty acids such as stearic, palmitic, oleic, naphthenic and similar acids. Thus, examples of suitable catalysts are such organic salts as cobalt stearate, oleate, or napthenate or iron linoleate. These salts are soluble in the liquid olefin feed and may be supplied to the first reaction zone as hydrocarbon solutions, preferably dissolved in the olefin feed.

The synthesis gas mixture fed to the first stage may consist of any ratio of $H_2$ to CO, but preferably these two gases are present at about one volume hydrogen per volume of CO. The conditions for the reaction of olefins with $H_2$ and CO vary somewhat in accordance with the nature of the olefin feed, but the reaction is generally conducted at pressures in the range of about 1500 to 4500 p. s. i. g., and at temperatures in the range of about 150° to 450° F.

One of the serious problems that has been encountered in the carbonylation or oxonation reaction as the first stage is frequently designated, has been the formation of secondary reaction products. The carbonylation reaction is a highly exothermic one, with a heat release of the same high order of magnitude as in the hydrocarbon synthesis reaction, about 35 to 50 K. cal./gram mol olefinic double bond reacted. For this and other reasons, secondary reaction products tend to form and careful temperature control is necessary in the carbonylation reaction zone to minimize this secondary reaction product formation. For instance, the decomposition of the carbonylation catalyst to metallic cobalt reaches an appreciable rate above 350° F. The presence of cobalt metal catalyzes such secondary reactions as polymerization of aldehydes, aldol condensations as well as hydrogenation of the aldehydes to alcohols which further react to yield acetals and hemiacetals with the aldehydes present. Esters may also be produced by a Cannizzaro type reaction.

The hydrogenation stage may be operated at conventional hydrogenation conditions which include temperatures, pressures, gas and liquid feed rates approximately within the ranges specified above for the first stage. Various known types of hydrogenation catalysts such as nickel, tungsten, molybdenum, their oxides and sulfides and others may be used. These include catalysts of both the sulfur sensitive and sulfur insensitive types. The catalyst may be supported on some suitable carrier such as charcoal. The liquid product from the hydrogenation stage is worked up by distillation to separate the desired alcohols from unconverted olefinic feed material, unhydrogenated carbonyl compounds, and saturated hydrocarbons formed in the process.

In the hydrogenation stage, in the presence of the hydrogenation catalysts and under the conditions employed, further condensations and reactions of the initially formed aldehydes and alcohols take place to give additional high boiling impurities which are generally allowed to remain as the "bottoms" after the distillation of the main portion of the alcohol is completed.

In a process for the manufacture of iso-octyl alcohol by a two stage Oxo process using $C_7$ olefinic feed, the final distillation of the crude $C_8$ alcohol product results in a bottom fraction representing about 15–30% of the crude alcohol charge to the distillation zone. This bottoms fraction consists of $C_8$ and $C_9$ alcohols, as well as $C_{15}$–$C_{16}$ alcohols, $C_{24}$ acetals and $C_{16}$ ethers. Of these constituents, the $C_8$ alcohols represent the final traces (1–5%) remaining in the bottoms from the distillation of the main product. The $C_9$ alcohols representing 5–30% of the bottoms are generally degraded to bottoms since the presence of this higher alcohol in the $C_8$ alcohol product has an adverse effect on the use of the $C_8$ alcohol for manufacture of plasticizers, such as dioctyl phthalates. Poorer colors and more brittle plasticizers result from the inclusion of even small amounts of $C_9$ alcohols in the $C_8$ alcohol product. The remaining 70% of the so-called bottoms consists primarily of higher boiling oxygenated compounds formed by side reactions as outlined above as occurring in either the first or second stage of the $C_8$ alcohol process. As clearly as can be determined by chemical analysis and infra-red absorption spectrographic study, these constituents were identified as $C_{15}$ secondary alcohols, $C_{15}$ aldehydes or ketones, $C_{24}$ acetals, $C_{22}$ ester of $C_{14}$ naphthenic acids used in making the cobalt catalyst for the first oxonation stage, and saturated and unsaturated $C_{16}$ ethers. A typical chemical analysis of the higher boiling oxygenated compounds obtained in a plant, and free from $C_8$–$C_9$ alcohols fraction, is shown in Table I. The hydroxyl number, free and combined carbonyl numbers, and saponification and acid numbers are expressed in terms of milligrams of potassium hydroxide per gram of sample analyzed.

TABLE I

*Typical composition of the Oxo alcohol bottoms*

Chemical analysis
    Hydroxyl No_____ 95
    Free carbonyl No_____ 0.5
    Combined carbonyl No_____ 29
    Saponification No_____ 21
    Acid No_____ 0.2
Constituents, per cent by weight
    48.6% $C_{15}$–$C_{16}$ alcohol
    0.2% $C_{15}$–$C_{16}$ aldehyde or ketone
    19.1% $C_{24}$ acetal
    14.7% $C_{22}$ (octyl naphthenate) ester
    [1] 17.4% saturated $C_{16}$ ester (dioctyl ether)

[1] Calculated by difference.

Analytical results obtained by chemical and infra-red methods appear to be in essentially good agreement as indicated by their comparison in Table II below:

TABLE II

*Comparison of analyses of Oxo alcohol bottoms*

| | Chemical Method | Infra-red Method |
|---|---|---|
| Per cent $C_{15}$–$C_{16}$ alcohols | 48.6 | 43 |
| Per cent $C_{15}$–$C_{16}$ ketones | 0.2 | .4 |
| Per cent $C_{22}$ ester | 14.7 | 13 |
| Per cent $C_{24}$ acetal | 19.1 | 9 |
| Per cent acid | Trace | |
| Per cent saturated $C_{16}$ ether | 17.4 | 27 |
| Per cent unsaturated $C_{16}$ ether | | 3 |

Thus it can readily be seen that the synthetic Oxo processes give complex mixtures of compounds having various carbon structures in the molecules and having varied molecular weights. Separation and isolation of the high boiling non-alcoholic impurities are particularly difficult. Sometimes it is possible to separate many of these mixtures into specific components and narrow fractions by distillation, solvent extraction and the like, but separations from the standpoint of obtaining substantially pure homogeneous fractions of relatively pure compounds in an economic process are impossible using the presently known methods. In some cases these difficultly separable mixtures are simply sent to slop or used in relatively cheap fuels. Thus, utilization of these higher boiling impurities which are formed in substantial amounts becomes a very important factor in governing the extent of application of the Oxo process as well as being a powerful economic factor.

This invention is mainly concerned with an efficient and selective oxidation process to convert these bottoms products into chemicals and intermediates having more commerical value than the starting materials. In a general way, this process can be termed an oxidative type reaction, although there are a number of striking and novel factors which distinguish it from the usual type oxidation process.

It has now been discovered that selective oxidation of these acetals, ethers and $C_{15}$ alcohols, breaking them down to the corresponding $C_7$–$C_8$ alcohols and $C_7$–$C_8$ fatty acids, is an excellent process for utilization of these higher oxygenated constituents. The $C_8$ and $C_9$ alcohol constituents in the bottoms are generally more valuable in their original alcohol form rather than as the corresponding acids and can usually be removed by simple fractionation. Following a preliminary distillation to remove $C_8$–$C_9$ alcohols, the resulting distillation bottoms are oxidized in a liquid phase operation at 100–300° F., at atmospheric to 500 p. s. i. g. pressure, preferably employing air as an oxidizing medium at rates of 10–100 liters/hr./100 grams of charge and using as a catalyst a fatty acid salt such as cobalt oleate or a similar oxidation catalytic agent, in concentrations of 0.2 to 3.5%, based on weight of the feed stock to the oxidation zone.

This selective oxidative reaction is applicable to various synthetic fractions derived from reaction products of the Oxo class which will contain alcohols, olefins and other compounds. In general, the starting feed mixtures are the Oxo bottoms after removal of the $C_8$ and $C_9$ alcohols and are composed of compounds having at least ten carbon atoms, and ordinarily from fifteen to twenty or more carbon atoms. These fractions are obtained by the so-called Oxo synthesis, and are the bottoms which remain after distillation of the main alcohol product. These higher boiling Oxo synthesis products include the higher molecular weight alcohols and aldehydes as well as relatively large amounts of acetals, hemiacetals, saturated and unsaturated ethers, and esters which may also be present.

It is to be particularly noted that the feed material employed in this process is especially low in aldehydic material. However, in spite of the composition comprising a relatively large number of compounds, this oxidation of each component to common products, particularly fatty acids, appears to proceed at relatively the same rate, and virtually no highly degraded products appear to contaminate the resulting fatty acids and alcohols.

These high boiling fractions of synthetically prepared oxygenated materials may be treated in numerous ways prior to subjecting them to this selective oxidation treatment. For instance, as noted above, they will quite generally be subject to fractionation by distillation. Solvent extraction, or some other type of selective process may also be employed and they may even be washed with various treating agents. Certain treatment methods such as acid and alkali washes, and further treating are of advantage to give better quality feed stocks to the oxidative zone.

This selective reaction for utilizing the bottoms product should preferably be carried out under specific and controlled conditions in order to get the proper degree of oxidation which may be required for a good selectivity between the branched and straight chain compounds.

The feed stocks which can be employed may differ more or less in specific composition, but the yields of products obtainable therefrom differ only very slightly when comparable reaction conditions are employed.

In general, on a once through basis, oxidized products consisting of about 40% of crude fatty acids and 40% of a mixture of alcohols are obtained when the process is carried out under optimum conditions. A recycle of the unsaponifiable material from the first oxidation back to a second oxidation would increase the ultimate yield of acid to 70–80%. Thus a control can be exercised on type of product obtained. Composition of bottoms being employed as feed stock may, of course, necessitate some variation in conditions to get optimum results.

It has been found that the selective oxidation can be quite satisfactorily carried out with air or oxygen-containing gas at temperatures ranging from 100° F., to about 300° F. Low temperatures, 100–180° F. in general, produce less acidic products and a correspondingly higher yield of non-saponifiable material. The products from low temperature reactions are frequently of better quality. Thus, as low a temperature as possible which is consistent with good yields, is the preferred mode of operation.

Higher temperatures give less selectivity and poorer quality products. Superatmospheric pressures up to 500 p. s. i. g. may be employed if desired. The rate of feed of oxidizing gas when air was employed to oxidize a bottoms fraction from a $C_8$ alcohol synthesis was found to be best at 10–100 l./hr./100 grams of feed.

The catalysts which may be used include any one or a mixture selected from well-known types of metallic soaps which have been employed as oxidation type catalysts. Various examples of such compounds are cobalt oleate, cobalt stearate, copper stearate, manganese stearate, and the like. The soap type catalysts may be added as such or they may be prepared in situ by the addition of the appropriate metallic salts to fatty acids. The particular metallic soap employed is not critical although variations in the kind of catalyst used may necessitate certain changes in the operation of the oxidation, such as in temperatures, in order to get the optimum yields. One important advantage of this invention is that it is not necessary to use pure soap compounds as catalysts since mixtures and impure products can be successfully employed.

Relatively small amounts of catalysts are necessary for the reaction, the exact amounts depending somewhat on the other conditions of operation and on the composition of the feed. In general, it has been found that 0.2% to 3.5% by weight of metallic soap catalyst based on the oxidation charge represents a very satisfactory concentration.

The oxidation process may be performed in either batch or continuous type operation.

The crude products formed from the selective oxidation may be worked up by well-known conventional procedures and the desirable fractions isolated and purified in any manner suitable to the product obtained. The crude mixture is preferably subjected to a saponification step with aqueous caustic to form soaps of the fatty acid products. The aqueous soap layer is then separated from the non-saponified layer of organic product. A solvent such as petroleum ether or the like can be used to extract the non-saponifiable portion of the reaction product. The crude acids can be easily isolated from the soap solution by acidification and subsequent extraction, preferably followed by a distillation. They can be further purified in any way desirable. The non-saponified oxidation product can be totally or partially recycled to oxidation. An alternative method of product work-up which gives an alcohol product of very good purity comprises the esterification of the alcohols in the non-saponifiable portion with boric acid, distillation of the non-alcoholic constituents, hydrolysis of the residual boric acid esters, and subsequent distillation of the released alcohols. An additional hydrogenation step for the unsaponifiable material will yield a better grade alcohol, since any ketones or aldehydes present are reduced. The purified product is of very good color and shows generally very satisfactory physical and chemical properties. The odor of the alcohols so obtained has been found to be excellent.

Products obtained as the separate fractions by this oxidation process may be utilized as such or they may be converted into other useful derivatives as desired. The acidic fraction comprising a mixture of carboxylic acids can, for instance, be made into various metal salts, thus forming the corresponding soaps, these being particularly useful as compositions for greases. As an alternative use, the acids can be converted to any kind of derivative of the carboxylic group, as for instance, an ester or an amide.

This invention will be better understood by reference to the annexed general flow plans represented by Figures 1 and 2.

Following the outline of Figure 1, a $C_7$ polypropylene polymer feed obtained by the UOP polymerization of a $C_3$–$C_4$ olefin feed stream is subjected to first stage carbonylation reaction with carbon monoxide and hydrogen in the presence of an active carbonylation catalyst such as a cobalt salt of a fatty acid under suitable conditions of temperature and pressure to give a $C_8$ Oxo aldehyde product which is in turn subjected to a second stage of catalytic hydrogenation to give a crude $C_8$ Oxo alcohol product. This alcohol product is distilled to give as fractions $C_8$ hydrocarbon-$C_8$ aldehyde mixture, a $C_8$ alcohol product, and a high boiling bottoms, boiling entirely above 380° F. This high boiling bottoms product is then preferably distilled under reduced pressure to a maximum vapor temperature of 225° F. at 10 mm. Hg. Normally an overhead cut of 0-28% of the total feed is thus removed as an overhead cut consisting essentially of $C_8$-$C_9$ alcohol, a large portion being $C_9$ alcohol. The remainder of the feed (29-100%) from the reduced pressure distillation is subjected to a liquid phase, air oxidation in the presence of a metallic soap oxidation catalyst at temperatures from 100° to 300° F. A crude oxidation product is thereby obtained which is thereafter saponified with caustic. The saponified portion containing the fatty acids is separated from the unsaponifiable portion which largely consists of alcohols. Acidification of the soaps of the fatty acids is followed by distillation of the free fatty acids. The unsaponifiable portion is recycled to the liquid phase, air oxidation step.

An alternate method for work-up of the crude oxidation product is outlined in Figure 2. The crude oxidation product is saponified and the saponified fraction is separated from the unsaponifiable portion. The soaps of the fatty acids are acidified and the free fatty acids distilled. The unsaponifiable portion of the oxidation product is subjected to a hydrogenation step to give a hydrogenated product largely composed of alcohols. This alcoholic product is esterified with boric acid and the crude boric acid products purified by distillation to a 500° F. bottoms temperature. The non-alcoholic overhead from this distillation is recycled to the oxidation step. The boric acid esters in the bottoms are hydrolyzed and distilled to yield pure alcohol products. Specific examples of this procedure follow below.

EXAMPLE 1.—PREPARATION OF OXIDATION FEED STOCK

A four liter charge of a still bottoms of oxygenated organic products obtained by the oxonation of a $C_7$ olefin followed by hydrogenation of the aldehydes was distilled in a 25 mm. Podbielniak column at 10 mm. Hg pressure, employing a 2:1 reflux ratio. The entire residual $C_8$ alcohol and any $C_9$ alcohol constituents were removed overhead to a maximum vapor temperature of 225° F. This cut boiled over a temperature range of 180-225° F. Inspection of the distillate and bottoms product are given below in Table III.

TABLE III

*Separation of $C_9$ alcohol from Oxo alcohol bottoms*

|  | Overhead Distillate | Bottoms |
|---|---|---|
| Weight per cent of still bottoms charges | 0-29 | 29-100 |
| Hydroxyl No | 394 | 93 |
| Carbonyl No | 1 | 1 |
| Saponification No | 1 | 25 |
| Acid No | 0.2 | 2 |
| Gravity, ° API | 37.1 | 33.3 |
| Color | Colorless | Light Yellow |

The colorless overhead distillate product was shown by its boiling range and hydroxyl number properties to consist largely of $C_9$ alcohols obtained in the iso-octyl alcohol process by oxonation of the $C_8$ olefins present in the $C_7$ olefin feed. The $C_9$ alcohols may be employed as solvents, or in the preparation of lacquer esters, or lube oil additives.

It has been shown by comparative data that an essential removal of both the $C_8$ and $C_9$ alcohol constituents in the bottoms is necessary and desirable. This removal is most advantageously done by a distillation procedure. In order to avoid decomposition and destruction of some of the alcohol bottoms, it is necessary to carry out this stripping or distillation step under reduced pressure to keep temperature as low as possible.

EXAMPLE 2.—OXIDATION OF THE 29-100% CUT OF OXO BOTTOMS

Three separate continuous oxidation runs each of 12 hours duration were carried out on the feed stock in an oxidation unit under conditions of 180° F. oxidation temperature, 1% of cobalt oleate catalyst and air rates of 47-50 liters/hours/100 grams of feed. The summary of the oxidation conditions and inspection and yields of products from the separate runs is presented in Table IV. This feed stock oxidized readily under the mild conditions employed and resulted in average yields of 9.5% by weight of light distillate and 96.5% of residual oxidation product. The light distillate portion, recovered from the exit gas in water cooled and Dry Ice-alcohol cooled condensation traps, contained about 20 cc. of water as well as oily product or 5% by weight of water based on the feed. Both products were pale yellow in color and lighter in this respect than the feed.

TABLE IV

*Oxidation of a 29-100% cut of Oxo bottoms*

| Run No | 1 | 2 | 3 |
|---|---|---|---|
| Feed Stock: |  |  |  |
| Hydroxyl No |  | 93 |  |
| Carbonyl No |  | 1 |  |
| Saponification No |  | 25 |  |
| Acid No |  | 2 |  |
| Gr. ° API |  | 33.3 |  |
| Oxidation Conditions: |  |  |  |
| Charge, Gms | 423 | 424 | 423 |
| Air Rate L/Hr./100 Gms | 47 | 50 | 49 |
| Temperature, ° F | 179 | 180 | 183 |
| Length of Run, Hrs | 12 | 12 | 12 |
| Catalyst, Weight Per Cent | (1) | (1) | (1) |
| Products, Weight Per cent on Feed: |  |  |  |
| Light Distillate | 7.5 | 10.4 | 10.6 |
| Residual Product | 97.5 | 96.5 | 95.5 |
| Residual Products, Hrs | 0-12 | 0-12 | 0-12 |
| Hydroxyl No | 96 | 88 | 85 |
| Carbonyl No | 70 | 58 | 67 |
| Saponification No | 157 | 172 | 166 |
| Acid No | 74 | 78 | 82 |
| Gr. ° API | 23.6 | 23 | 22.6 |

[1] 1% Cobalt oleate.

The composite residual and light distillate oxidation product from the above runs representing a net yield of 100.5% of the feed (excluding water layer), was worked up as follows to determine the yield and quality of both the acid and alcohol products which could be obtained from a once-through oxidation. The composite oxidation product was first saponified by refluxing with 1000 cc. of 20% NaOH for 3 hours at 220-230° F. The saponification product was cooled and extracted with a total of 1000 cc. of petroleum ether to remove the unsaponifiable matter. The residual soap solution formed from the fatty acids was then steam distilled to recover the last traces of unsaponifiable which were added to the original extract of the unsaponifiable. The crude soap solution was made slightly acid with dilute (10%)

$H_2SO_4$ and the separated fatty acids extracted with petroleum ether. The petroleum ether extract of the fatty acids was washed with water to remove final traces of mineral acids and, after removal of the solvent, was distilled at atmospheric pressure to a bottoms temperature of 300° F. to recover the crude acids. The petroleum ether extract of the unsaponifiable matter was dried, distilled, and inspected in a similar manner. The following data in Table V were obtained on the products.

TABLE V

*Inspection of Oxo bottoms oxidation products*

| | Crude Oxidation Product | Crude Acid Product | Unsaponifiable Product |
|---|---|---|---|
| Weight Per Cent of Oxidation Feed | 100.5 | 38 | 59.4 |
| Hydroxyl No | 90 | | 176 |
| Carbonyl No | 65 | | 26 |
| Saponification No | 165 | 276 | 4 |
| Acid No | 78 | 234 | 0.7 |
| Gr. ° API | 23.4 | | |
| Color | Yellow | Brown | Orange Red |

The data indicate that work-up of the crude oxidation product results in recovered yields, based on the oxidation feed (29–100% cut of the Oxo still bottoms), of 38% by weight of crude acids and 59.4% of crude unsaponifiable containing a high concentration of alcohol constituents.

Hydrogenation of the crude unsaponifiable product with 10% by weight of nickel hydrogenation catalyst at 350° F. for twelve hours at 2700 p. s. i. g. hydrogen pressure resulted in a 98.5% by weight yield of hydrogenated product which showed the properties given below in Table VI.

TABLE VI

*Inspection of crude hydrogenation product of unsaponifiable portion*

| | |
|---|---|
| Yield, weight per cent of oxidation feed | 58.5 |
| Hydroxyl No | 223 |
| Carbonyl No | 1 |
| Saponification No | 5 |
| Acid No | 1.1 |
| Color | Pale Yellow |

From a comparison of the data obtained on the unsaponifiable matter and hydrogenated product, some increase in the total hydroxyl plus carbonyl constituents occurred during hydrogenation, probably resulting from the partial hydrogenation of the $C_{24}$ acetal to $C_8$ alcohols.

The hydrogenated unsaponifiable portion was then esterified with boric acid to prepare the boric acid esters of the alcohols. The product after removal of the benzene solvent (used to remove water of esterification) at atmospheric pressure to 200° F. maximum vapor temperature, was further distilled under 2 mm. Hg pressure to 500° F. bottoms temperature to take overhead as distillate the non-alcoholic constituents, including unreacted $C_{24}$ acetal and $C_{16}$ ether constituents. A net recovery, based on the oxidation feed, of 15.4% by weight of overhead distillate fraction was obtained. The boric acid ester bottoms after hydrolysis yielded 38% of crude alcohols based on the original oxidation feed. Fractionation of the crude alcohols at 1 mm. Hg absolute pressure and 2:1 reflux ratio yielded the following cuts which were inspected. The data are reported in Table VII.

TABLE VII

*Fractionation of the crude alcohols after boric acid esterification*

| Cut No. | B. P. ° F. 1 mm. Hg | Weight Per cent of Crude Alcohols | Weight Per cent of Oxidation Feed | Color | OH No. | Acid No. | Sap. No. | Identity |
|---|---|---|---|---|---|---|---|---|
| Charge | | 100 | 38 | Light Brown | | | | |
| Cut #1 | 94–116 | 23.4 | 9.0 | Colorless | 428 | <1 | | $C_8$ |
| Cut #2 | 117–145 | 9.3 | 3.5 | do | 385 | | | $C_9$ |
| Cut #3 | 146–220 | 50.0 | 19.0 | Pale Yellow | 230 | <1 | <1 | $C_{15}$–$C_{16}$ |
| Cut #4 | 220–230 | 4.0 | 1.5 | Yellow | 160 | 4 | 14 | |
| Bottoms [1] | | 11.9 | 4.5 | Viscous red oil. | | | | |

[1] Maximum bottoms temperature of 550° F.

A similar type of distillation of the crude acids yielded the data shown in Table VIII.

TABLE VIII

*Fractionation of the crude acids*

| Cut No. | B. P. ° F. 1 mm. Hg | Weight Per cent of Crude Acids | Weight Per cent of Oxidation Feed | Color | Odor | Acid No. | Sap. No. | Identity |
|---|---|---|---|---|---|---|---|---|
| Charge | | 100 | 38 | Brown | | | | |
| Cut #1 | 128–156 | 25.2 | 9.6 | Colorless | Good | 331 | 387 | $C_8$ |
| Cut #2 | 156–164 | 12.9 | 4.9 | do | do | 370 | 373 | $C_8$ |
| Cut #3 | 165–170 | 10.7 | 4.1 | Pale yellow | do | 360 | 364 | $C_8$–$C_9$ |
| Cut #4 | 170–187 | 6.7 | 2.5 | do | do | 316 | 331 | $C_9$–$C_{10}$ |
| Cut #5 | 187–220 | 6.9 | 2.6 | Yellow | do | 194 | 232 | $C_{14+}$ |
| Cut #6 | 220–240 | 10.1 | 3.8 | Lt. orange | Fair | 132 | 196 | $C_{14+}$ |
| Cut #7 | 240–241 | 4.2 | 1.6 | Orange | do | 109 | 185 | $C_{14+}$ |
| Bottoms [1] | | 23.3 | 8.9 | Tarry Brown. | Odorless | | | |

[1] Maximum distillation bottoms temperature of 500° F.

EXAMPLE 3.—OXIDATION OF THE 0–28% CUT OF THE BOTTOMS FROM C₈ OXO ALCOHOL MANUFACTURE

An oxidation run was made in which the 0–28% cut (chiefly C₈–C₉ alcohols) from the total Oxo bottoms from the C₈ alcohol Oxo process was oxidized under substantially the same conditions as in Example 2. Oxidation for twelve hours at 180° F. with 1% cobalt oleate catalyst and air rate of 50 l./hr./100 grams of charge resulted in net yield of 16.0% of light distillate and 86.9% of residual oxidation product. The data from inspection of the latter product as compared with the data on the feed showed slight if any oxidation of this feed to acids had resulted from the oxidation. The data is compared in Table IX.

TABLE IX

*Oxidation of a 0–28% cut of Oxo bottoms*

|  | 0–28% Cut of Initial Feed | Residual Oxidation Product |
|---|---|---|
| Hydroxyl No | 394 |  |
| Carbonyl No | 1 | 4 |
| Saponification No | 1 |  |
| Acid No | 0.2 | 1.6 |
| Gr. ° API | 37.1 | 36.7 |

From the above experiment, it is evident that for best yields of acids as well as neutral products it is desirable to remove the C₈–C₉ alcohol cut in the Oxo bottoms fraction, preferably by distillation, prior to oxidation.

What is claimed is:

1. A selective oxidation process for utilization of mixtures of oxygenated organic compounds produced as still bottoms in a two-stage operation consisting of a first stage in which hydrogen, carbon monoxide and an olefin are contacted in the presence of a carbonylation catalyst forming a product predominantly aldehyde and of a second stage, in which the said aldehyde product is catalytically reduced with hydrogen to form the corresponding alcohol and thereafter removing the major portion of low-boiling alcohol components by distillation, leaving behind a still bottoms product containing a mixture of alcohols, acetals, esters, and ethers as compounds, the major portion of whose components have at least two more additional carbon atoms per molecule than the original olefin, which comprises oxidizing in liquid phase said still bottoms product with an oxygen-containing gas in the presence of a metallic soap oxidation catalyst, whereby a reaction product is obtained which consists essentially of a mixture of fatty acids and neutral compounds which are chiefly alcohols.

2. A process such as that described in claim 1 in which the olefin used in the first stage is in the range of C₇ to C₁₅.

3. A process such as that described in claim 1 in which the olefin used in stage one is a C₇ olefin stream and the bottoms product essentially consists of alcohols, acetals, esters, and ethers having at least ten carbon atoms.

4. A selective oxidation process for utilization of high-boiling mixtures of oxygenated organic compounds produced as a still bottoms product in a two-stage operation consisting of a first stage in which hydrogen, carbon monoxide and a C₇ olefin stream are contacted in the presence of a carbonylation catalyst forming a product predominantly aldehyde and of a second stage, in which the said aldehyde product is catalytically reduced with hydrogen to form a crude alcohol product essentially consisting of the corresponding C₈ alcohol product and thereafter distilling from said crude alcohol product substantially all components having less than nine carbon atoms per molecule and leaving behind a still bottoms product whose components have more than nine carbon atoms per molecule, which comprises oxidizing in liquid phase said still bottoms product with an oxygen-containing gas at temperatures from 100° to 300° F., and in the presence of a small amount of a metallic soap oxidation catalyst, whereby a reaction product is obtained which consists essentially of a mixture of fatty acids and neutral compounds which are chiefly alcohols.

5. A process such as that described in claim 4 in which the high-boiling bottoms product essentially consists of alcohols, acetals, esters, and ethers.

6. A selective oxidation process for utilization of high-boiling mixtures of oxygenated organic compounds produced as a still bottoms product in a two-stage operation consisting of a first stage in which hydrogen, carbon monoxide and a C₇ olefin stream are contacted in the presence of a carbonylation catalyst forming a product predominantly aldehyde and of a second stage, in which the said aldehyde product is catalytically reduced with hydrogen to form a crude alcohol product essentially consisting of the corresponding C₈ alcohol product and thereafter distilling from said crude alcohol product substantially all components having up to and including nine carbon atoms per molecule and leaving behind a still bottoms product whose components have more than nine carbon atoms per molecule, which comprises oxidizing in liquid phase said still bottoms product with air at temperatures from 100° to 300° F., and in the presence of a metallic soap oxidation catalyst, whereby a reaction product is obtained consisting essentially of a mixture of fatty acids and neutral compounds which are chiefly alcohols, saponifying the fatty acids with caustic, solvent-extracting non-saponifiable neutral compounds from the resulting product, acidifying the saponified fatty acids, recovering the free fatty acids, and isolating said neutral compounds from the extraction solvent solution of the non-saponifiable fraction.

7. A process for preparing fatty acids and alcohols from high-boiling mixtures of oxygenated organic compounds produced as a still bottoms product in a two-stage operation consisting of a first stage in which hydrogen, carbon monoxide and a C₇ olefin stream are contacted in the presence of a carbonylation catalyst forming a product predominantly aldehyde and of a second stage, in which the said aldehyde product is catalytically reduced with hydrogen to form a crude alcohol product essentially consisting of the corresponding C₈ alcohol product and thereafter distilling from said crude alcohol product substantially all components having up to and including nine carbon atoms per molecule and leaving behind a still bottoms product whose components have more than nine carbon atoms per molecule, which comprises oxidizing in liquid phase said still bottoms product with air at temperatures of approximately 180° F., and in the presence of 1% cobalt oleate catalyst, whereby a reaction product is obtained consisting essentially of a mixture of fatty acids and neutral compounds which are chiefly alcohols, saponifying the fatty acids with caustic, solvent-extracting the non-saponifiable neutral compounds from the saponification mixture, neutralizing to recover the free fatty acids, isolating and again subjecting said non-saponifiable neutral compounds to the oxidation step.

8. A selective oxidation for utilization of high-boiling mixtures of oxygenated organic compounds produced as a still bottoms product in a two-stage operation consisting of a first stage in which hydrogen, carbon monoxide and a $C_7$ olefin stream are contacted in the presence of a carbonylation catalyst forming a product predominantly aldehyde and of a second stage, in which the said aldehyde product is catalytically reduced with hydrogen to form a crude alcohol product essentially consisting of the corresponding $C_8$ alcohol product and thereafter distilling from said crude alcohol product substantially all components having up to and including nine carbon atoms per molecule and leaving behind a high-boiling bottoms product whose components have more than nine carbon atoms per molecule, which comprises oxidizing in liquid phase said still bottoms product with air at temperatures from 100° to 300° F., and in the presence of a metallic soap oxidation catalyst, whereby a reaction product is obtained consisting essentially of fatty acids and neutral compounds which are chiefly alcohols, saponifying the fatty acids with caustic, separating the non-saponifiable neutral compounds from the saponified fatty acids, neutralizing the caustic to recover the free fatty acids, distilling said free fatty acids and returning said non-saponifiable neutral compounds to the oxidation process, whereby said still bottoms product is substantially completely converted to fatty acids by repeating in sequence the steps of the process.

9. A process for preparing fatty acids and alcohols from high-boiling mixtures of oxygenated organic compounds produced as a still bottoms product in a two-stage operation consisting of a first stage in which hydrogen, carbon monoxide and a $C_7$ olefin stream are contacted in the presence of a carbonylation catalyst forming a product predominantly aldehyde and of a second stage, in which the said aldehyde product is catalytically reduced with hydrogen to form a crude alcohol product essentially consisting of the corresponding $C_8$ alcohol product and thereafter distilling from said crude alcohol product substantially all components having up to and including nine carbon atoms per molecule and leaving behind a still bottoms product whose components have more than nine carbon atoms per molecule, which comprises oxidizing in liquid phase said still bottoms product with air at temperatures of approximately 180° F., and in the presence of 1% cobalt oleate catalyst, whereby a reaction product is obtained consisting essentially of a mixture of fatty acids and neutral compounds which are chiefly alcohols, saponifying the fatty acids with caustic, solvent-extracting the non-saponifiable neutral compounds, neutralizing the caustic to recover the free fatty acids, distilling said free fatty acids, isolating neutral compounds from the extraction solvent, hydrogenating said non-saponifiable neutral compounds, producing the boric acid esters of the crude alcohols from said hydrogenation, distilling non-alcoholic impurities from said boric acid esters, hydrolyzing said boric acid esters, and distilling the resulting alcoholic products.

10. A process for obtaining more valuable fatty acid and alcohol products from a high-boiling mixture of oxygenated organic compounds having at least 10 carbon atoms per molecule in the still bottoms of an Oxo product formed from a $C_7$ olefin reacted first with carbon monoxide and hydrogen to produce predominantly a $C_8$ aldehyde that is hydrogenated to form a corresponding $C_8$ alcohol and said higher boiling Oxo still bottoms product, which comprises oxidizing said Oxo still bottoms in liquid phase with gaseous oxygen to form a mixture of fatty acids with an unsaponifiable product, then separating the unsaponifiable product from said fatty acids.

11. A process as described in claim 10, wherein the unsaponifiable product of the oxidized Oxo still bottoms separated from the fatty acids is catalytically hydrogenated to produce additional amounts of $C_8$ and $C_9$ alcohols with $C_{15}$ to $C_{16}$ alcohols.

JOHN J. OWEN.
EGI V. FASCE.

REFERENCES CITED

The following references are of record in the file of this patent:

UNITED STATES PATENTS

| Number | Name | Date |
|---|---|---|
| 1,987,559 | Hintermaier | Jan. 8, 1935 |
| 2,415,102 | Landgraf | Feb. 4, 1947 |
| 2,433,015 | Roland et al. | Dec. 23, 1947 |
| 2,480,564 | Forney | Aug. 30, 1949 |